Oct. 2, 1934.  M. BUCY  1,975,082
VAPORIZER
Filed Aug. 11, 1932  2 Sheets-Sheet 1
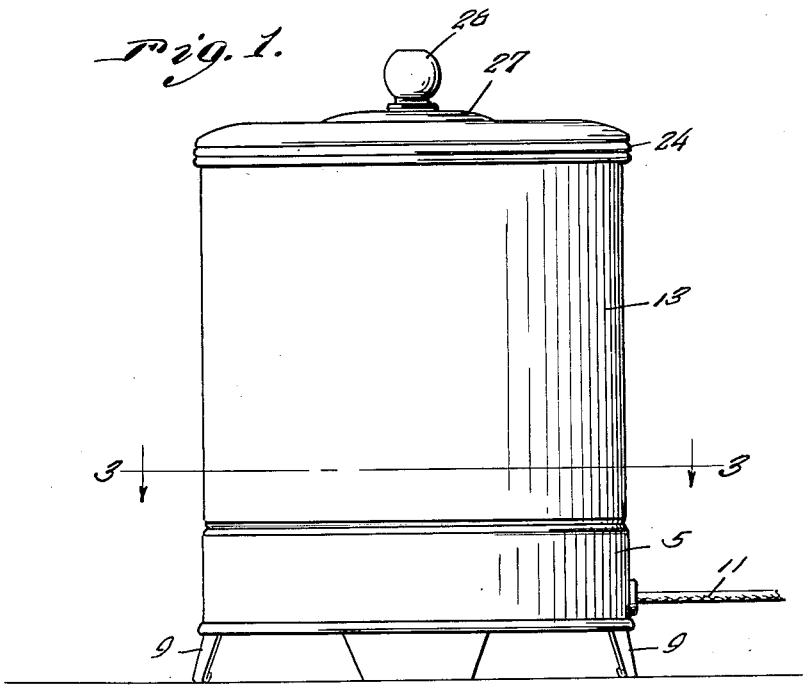
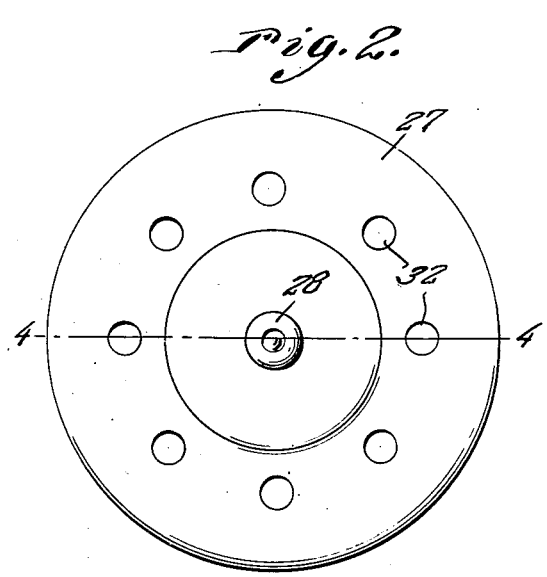
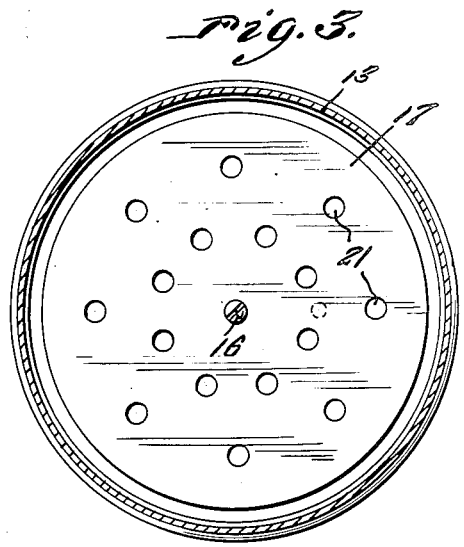
Inventor
Milton Bucy
By Clarence A. O'Brien
Attorney Oct. 2, 1934.  M. BUCY  1,975,082
VAPORIZER
Filed Aug. 11, 1932  2 Sheets-Sheet 2
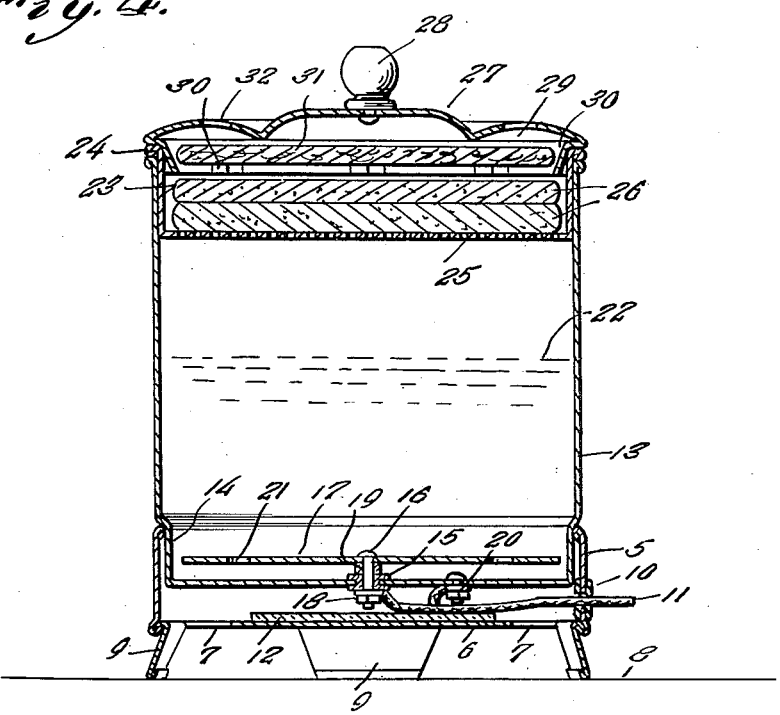
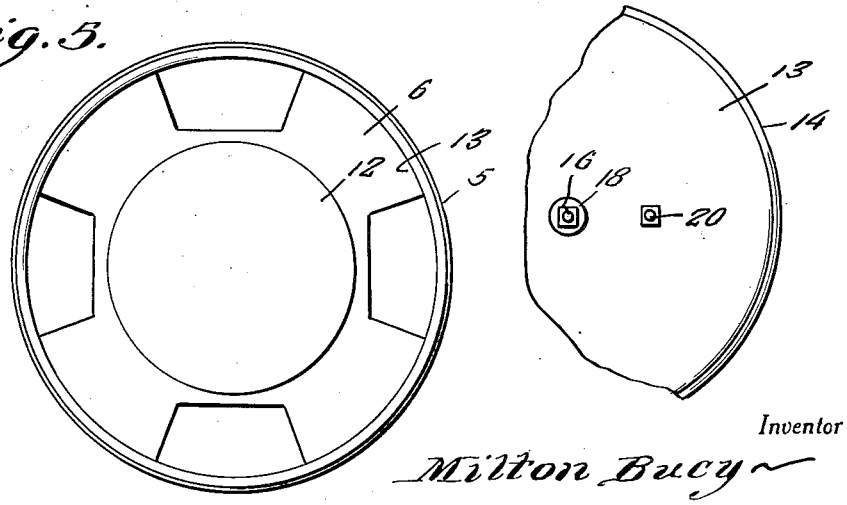
Inventor
Milton Bucy
By Clarence A. O'Brien
Attorney Patented Oct. 2, 1934

1,975,082

UNITED STATES PATENT OFFICE 1,975,082

VAPORIZER

Milton Bucy, Waukegan, Ill.

Application August 11, 1932, Serial No. 628,422

1 Claim. (Cl. 219—40)

This invention appertains to new and useful improvements in vaporizers of the electrical type, the same being capable of use for various purposes such as disinfecting, deodorizing, fumigating, and demothing and for medicinal purposes.

The principal object of the present invention is to provide a small compact yet efficient vaporizer which can be readily carried about from place to place, but which in operation will generate a copious supply of vapor for any useful purpose.

An important object of the present invention is to provide a vaporizer wherein chemical can be conveniently supported for contact with the generated vapors.

Another important object of the invention is to provide a vaporizer wherein the parts are capable of being readily disassembled for the purpose of repair, replacement or cleaning.

These and various other important objects and advantages of the invention will become apparent to the reader of the following specification.

In the drawings:—

Figure 1 represents a side elevational view of the vaporizer in its entirety.

Fig. 2 represents a top plan view of the lid.

Fig. 3 represents a horizontal sectional view taken substantially on line 3—3 of Fig. 1.

Fig. 4 represents a vertical sectional view taken substantially on line 4—4 of Fig. 2.

Fig. 5 represents a bottom plan view of the base.

Fig. 6 represents a fragmentary bottom plan view of the pot.

Referring to the drawings wherein like numererals designate like parts, it can be seen that numeral 5 represents an annular base having a bottom 6 provided with peripheral cut-out portions 7. The bottom 6 is supported above a supporting surface 8 by leg members 9.

This annular base member 5 has an opening therein in which is threaded the di-electric eyelet 10 through which the conductor coil 11 is disposed. Numeral 12 represents a di-electric plate mounted upon the bottom 6 of the base 5 and in opposed relation to the bottom of the pot 13, which has a radially reduced portion 14 and its lower end for disposition within the annular base 5 in a manner as substantially shown in Fig. 4. The bottom of the pot 13 is provided centrally with an opening receiving the di-electric plug 15 through which extends the bolt 16. This bolt 16 extends downwardly through the electro-static plate 17 which is of disk-shape and through the plug 15 to a point below the bottom of the pot 13 where the bolt is provided with a nut 18. A spacer in the form of a di-electric collar 19 is provided around the bolt 16 between the plate 17 and the bottom of the pot 13 for obviously spacing the plate 17 from the bottom of the pot 13.

One side of a current supply line is connected as at 20 to the bottom of the pot 13, while the other side of the supply circuit is connected to the aforementioned bolt 16.

Obviously, when the current is cut on, that is when the circuit is closed, current will pass through the bolt 16 to the plate 17 and by electrical discharge across the space to the bottom of the pot 13 and from there to the return side of the circuit, (not shown).

It will be observed that the electro-static plate 17 is provided with openings 21 therein, so that the water content 22 of the pot 13 will have an opportunity to gyrate or circulate through these openings and between the plate 17 and the bottom of the pot 13. The water may contain a suitable and sufficient substance to promote an electrical discharge between the plate 17 and the bottom of the pot 13.

Depending into the upper portion of the pot 13 is the tray 23 having an outwardly disposed bead 24 at its upper end to rest upon the upper edge of the pot 13.

Within this tray 23 and superimposed upon the perforated bottom 25 thereof are the chemical containing pads 26 which are permeated by the vapors arising from the liquid content 22, which is usually water.

Numeral 27 represents a lid having a knob 28, this lid being provided with a depending annular flange 29 for slip-type engagement within the tray 23 in the manner substantially shown in Fig. 4. The flange 29 is provided at equal spaced intervals with inwardly disposed portions defining projections 30 which will support a pad 31 within the lid 27 when the pad is forced into the sleeve within the lid above the said projections 30 by of course flexing the pad so that placement can be made upwardly beyond the projections 30.

It will also be observed that the lid 27 is provided with vapor outlet openings 32 through which the chemically treated vapor can emanate.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

A vaporizer comprising a base, a pot, a perforated chemical supporting tray in the pot, a lid for the tray, an electrode mounted within the pot and electrically separated therefrom, an electricity supply circuit having one side connected to the electrode and the other to the pot, the said base including an annular wall having a horizontal platform therein, said pot being provided with a reduced lower portion defining a shoulder for resting upon the upper portion of the said annular wall, while the reduced portion depends into the wall to terminate above the platform, and a plate of di-electric material on the platform upon which conductors connected to the pot and electrode can rest.

MILTON BUCY.